United States Patent [19]

Griesing et al.

[11] 3,967,516
[45] July 6, 1976

[54] TRIMMING BLOW MOLDED PLASTICS ARTICLES

[75] Inventors: John E. Griesing, East Granby; Dan Weissmann, Bloomfield, both of Conn.

[73] Assignee: Monsanto Company, St. Louis, Mo.

[22] Filed: Sept. 30, 1974

[21] Appl. No.: 510,296

[52] U.S. Cl. .................................. 82/47; 82/83; 82/101
[51] Int. Cl.² .................. B23B 5/14; B29C 17/10
[58] Field of Search ............... 82/47, 46, 51, 53, 83, 82/84, 88, 101, 102

[56] References Cited
UNITED STATES PATENTS

| | | | |
|---|---|---|---|
| 3,406,598 | 10/1968 | Doucet | 82/46 |
| 3,429,211 | 2/1969 | Pelot | 82/46 |
| 3,481,233 | 12/1969 | Yann et al. | 82/101 X |
| 3,653,285 | 4/1972 | Yoshikawa et al. | 82/101 |
| 3,675,521 | 7/1972 | Ziegler | 82/101 |
| 3,756,103 | 9/1973 | Cvacho et al. | 82/47 |
| 3,800,638 | 4/1974 | Duikers et al. | 82/101 |
| 3,886,824 | 6/1975 | Michel et al. | 82/47 |

*Primary Examiner*—Leonidas Vlachos
*Attorney, Agent, or Firm*—Michael J. Murphy

[57] ABSTRACT

In a method and apparatus for trimming flash from blow molded articles with a rotating blade as they traverse a path of travel between a fixed guide and a rotary drive wheel, improvements are provided which include a mounting for the blade eccentrically offset from the axis of the drive wheel which allows the articles to be firmly supported by the guide and drive wheel before cutting commences, thereby improving the quality of the cut from the standpoint of reducing variability in planarity and in vertical position with respect to adjacent portions of the usable part of the article.

12 Claims, 2 Drawing Figures

TRIMMING BLOW MOLDED PLASTICS ARTICLES

CROSS REFERENCE TO RELATED U.S. APPLICATIONS

Serial No. 467,378, filed May 6, 1974, now U.S. Pat. No. 3,894,454.

Serial No. 472,638, filed May 23, 1974.

BACKGROUND OF THE INVENTION

This invention relates to trimming blow molded articles and more particularly to trimming flash from such articles with a rotating blade as they traverse a cutting path.

Removing flash formed integral with the usable portion of an unfinished blow molded article downstream of the molding station by means of a knife penetrating the plastic at the desired level as the article advances along a path between fixed and moving guide members is known in the art. For example, a system employing a linear path is disclosed in U.S. Pat. No. 3,429,211 whereas systems utilizing a curved path are disclosed in U.S. Pat. Nos. 3,406,598; 3,675,521 and 3,800,638. Though both are well used in the industry, primarily because of simplicity of equipment and process design, the type using a rotating wheel as the moving guide member has the advantage amongst others of providing a truly solid support for the article on the moving side of the cutting path. This minimizes slippage of the part on the moving surface during sectioning and the concomitant problem of variability in spacing of the parts which could result in contact and sticking together of adjacent pieces if the plastic is at a somewhat elevated temperature and not quite set. Also, when support during trimming is in the flash area and it is intended that the trimming part fall by gravity into a waiting holder moving in phase beneath it as it traverses the cutting path, as in the case of the system described in commonly owned copending U.S. application Ser. No. 467,378, filed May 6, 1974, such slippage can result in misalignment of the part with such holder so that when it does fall in an off-center manner, it randomly strikes some surface of the receiving means not really meant to act as the support member and undesirably topples to the side out of the system.

Such copending U.S. Ser. No. 467,378, filed may 6, 1974, discloses a fixed blade trimming assembly utilizing a rotary drive wheel particularly suitable for sectioning parts at elevated temperature where the material is pliant and not fully set. The temperature range of the plastic in the region of the cut as therein specified should be controlled to give optimum cutting - i.e. if the plastic is too cold cracking can occur, whereas if too hot, stretching across the blade surface occurs resulting in an incomplete cut. Though such assembly functions well it has a few deficiencies. More specifically, the elevated temperature range within which an acceptable quality cut is attainable is somewhat narrow and difficult to consistently maintain, especially when upstream blow mold cooling conditions which set the temperature of the part to start with, vary somewhat. It would therefore be desirable from the standpoint of process flexibility to broaden such operating range without sacrificing the quality of the cut.

U.S. Pat. No. 3,406,598 discloses a trimming system of the general type under consideration which cuts on an arc using a wheel as the moving guide with the blade integral witht the wheel. Such system would appear adequate when the finished articles do not require particularly close tolerances on the top surface, as, for example, when the trimmed article is to remain open in use, or if a container, is not intended to hold any substantial pressure. However, when the end use requires a close, cooperating fit of the trimmed surface with another member, or in other words, when extremely close tolerances must be held on such surface, e.g. when meant to cooperate later with a flush, close-fitting closure adequate to contain substantial pressure within the finished article, the system disclosed in such patent is deficient. This is because the vertical location of the cut in the referenced system is determined by the relative positions of the knife and a molded groove in the article, and the surface of such groove can vary slightly depending on the degree of shrinkage which has occurred in the material as determined by its temperature, which shrinkage can vary in successive articles at the time of arrival at the cutting station. Such vertical variability is especially serious when the article is purposely at a high temperature yet within a variable range, and sag due to weakness of the dimensionally unstable plastic is pronounced and variable. Also, since the knife is necessarily larger than the supporting wheel in the referenced system so that cutting can occur, penetration commences a fraction of a second before the article is supported on the blade side, and consequently sidewise canting of the part occurs which results in the trimmed surface deviating somewhat from a truly horizontally flat, planar objective. Also, the blade being integral with and larger than the wheel, penetration through the full wall commences immediately on contact and this produces a sort of splitting or wedging type of penetration resulting in a rough, wavy, trimmed surface not especially suitable for flush, face-to-face contact with a subsequently applied closure.

SUMMARY OF THE INVENTION

Now, however, improvements have been made which satisfy needs aand overcome deficiencies in systems for trimming flash from blow molded articles utilizing a blade to penetrate the object as it is moved along a cutting path by guide members.

Accordingly, a principal object of this invention, in its broadest aspects, is to provide improvements in rotary blade trimming systems for use in sectioning blow molded thermoplastic articles.

Another object of this invention is to provide improvements in such systems whereby the quality of the cut in terms of planarity, smoothness, and vertical location with respect to adjacent portions of the article is improved.

An additional object of this invention is to provide improvements in such systems which render them especially attractive for use in deflashing blow molded containers, or parts to be formed into such containers, which at the time of deflashing have molded neck finishes which will require a tight fit with a later applied closure.

A still further object of this invention is to broaden the versatility of a rotary blade trimming system as regards temperature, wall thickness, and type of plastic which can be handled by a single system.

Another object of this invention is to provide a trimming system especially suited for deflashing hollow, blow molded articles at elevated temperature, such as preforms to be later remolded into other forms such as containers.

Another object of this invention is to provide improvements in such a system for trimming objects at elevated temperature which reduce the sensitivity of the system to the temperature of the plastic at the time of cut, as such temperature affects the quality of the cut.

A specific object of this invention is to provide improvements in such a system which render it especially adapted for use with a rotating screw type of supply means for delivering non-self supporting parts to the trimming station.

A further specific object of this invention is to provide improvements in the manner in which the article to be trimmed is presented to the rotating blade, as such manner for presentment affects the quality of the cut.

A still further object of this invention is to provide means to carry out the above objects.

Other objects of this invention will in part appear hereinafter and will in part be obvious from the following disclosure and claims.

These and other objects are accomplished in apparatus for trimming flash from blow molded articles of thermoplastic material as they move along a path of travel which includes guide means extending along the path for engaging the articles and advancing them along the path and rotary blade cutting means for severing the flash from the articles as they traverse the path, by providing the improvement whereby the articles are well supported before engagement with the rotary blade cutting means, which comprises, in combination, means delaying penetration of the thermoplastic material by the rotary blade cutting means until after the articles are engaged by the guide means.

Such means delaying penetration preferably comprises a rotary mounting for the rotary blade cutting means eccentrically offset with respect to the axis of a moving member of the guide means.

From a process standpoint, there is provided in a method of trimming flash from blow molded articles of thermoplastic material which includes cutting through the plastic material at the joint between the flash and the remainder of the article with a blade rotating with a path of travel of the articles as they are advanced along such path by guide members, the improvement whereby the variability in vertical position and horizontal planarity of the cut is reduced, which comprises, in combination, the step of engaging the articles with the guide members before commencing cutting.

BRIEF DESCRIPTION OF THE DRAWINGS

In describing the overall invention, reference will be made to the accompanying drawing wherein.

DETAILED DESCRIPTION OF THE ILLUSTRATED EMBODIMENT

Figure 1:
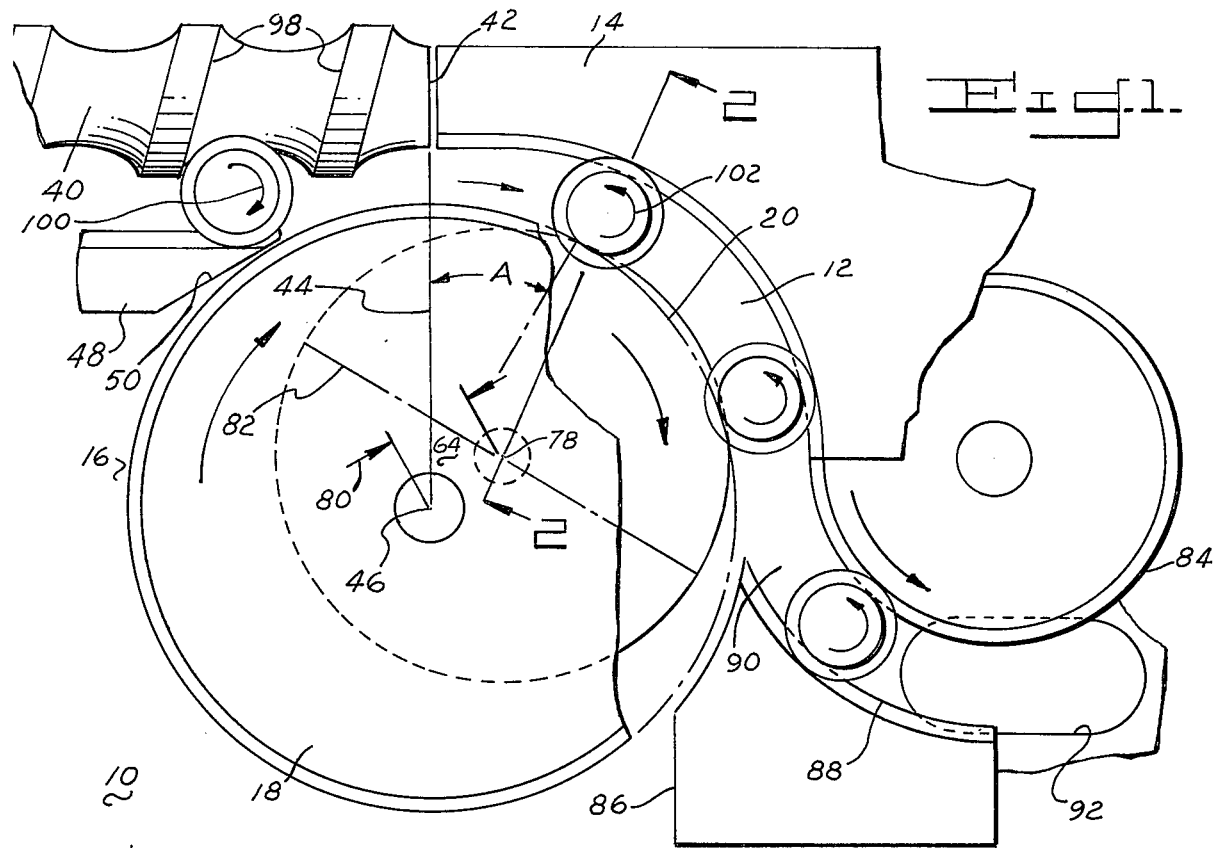
FIG. 1 is a schematic plan view of apparatus embodying the present invention.
Figure 2:
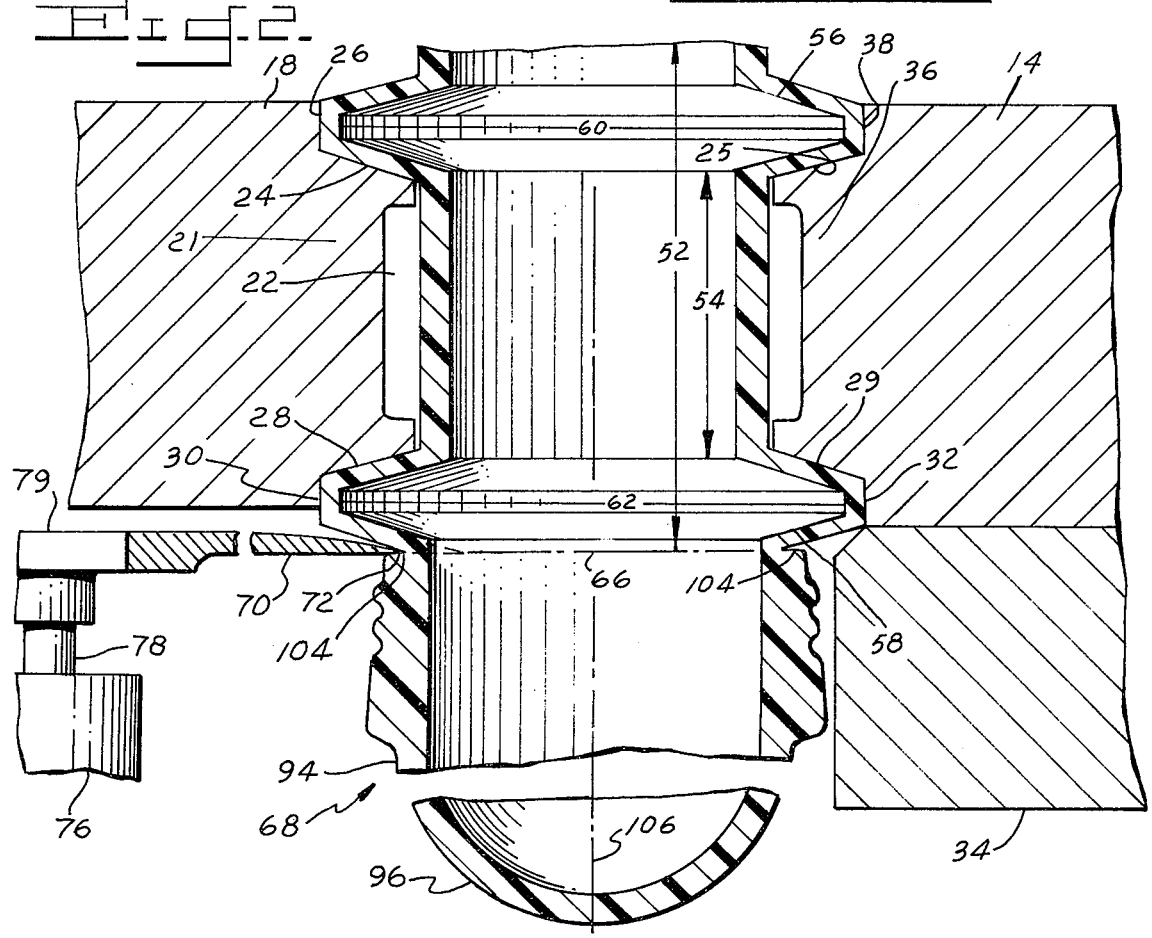
FIG. 2 is an elevational view along 2—2 of FIG. 1.

Referring now to the drawing, there is illustrated in FIG. 1, apparatus generally indicated as 10 for trimming flash from blow molded articles of thermoplastic material as they move along a path of travel 12. Apparatus 10 comprises guide means which include fixed guide means 14 in the form of an anvil curvilinear in contour along the portion defining one side of path 12 and laterally spaced from moving guide means 16 which comprises drive wheel 18 partially overlapping blade 70, to be described, and having a circumference 20 matching the curvilinear configuration of anvil 14, such means 14 and 16 defining the lateral limits of path 12 between them. The vertical contour of wheel 18, as shown in FIG. 2, is continuous around its full periphery and includes nose portion 21, which may be cut away at 22, projecting toward path 12 and tapering upwardly at its upper end at 24 into the lower end of upper vertical gripping land section 26, and downwardly at 28 at its lower end to the upper end of lower vertical land section 30, both land sections 26 and 30 being rearward of nose portion 21. As apparent from FIG. 2, the vertical profile of anvil 14 is substantially identical and complementary to that just described for wheel 18 except, in the illustrated embodiment, lower land section 32 is a little longer than at 30 for wheel 18. Bead guide 34 in the form of a plate is attached to the lower surface of anvil 14 rearwardly of projecting nose portion 36. The compression surfaces of land sections 26, 30, 32 and 38 are preferably knurled.

Referring now to FIG. 1, though other means such as a flat belt conveyor may be used to present untrimmed articles to the trimming station, a preferred embodiment of delivery means for depositing articles at the inlet end of path 12 comprises screw conveyor 40 journaled for rotation in conventional manner, and which has the longitudinal axis of the most downstream portion of its length adjacent to, yet outward of periphery 20 of wheel 18, Screw 40 extends generally perpendicular to axis 46 of wheel 18 and has a terminal end 42 lying substantially in a vertical plane 44 parallel to longitudinal axis 46 of drive wheel 18 and located at a 12 o'clock position with respect to wheel 18 when viewed as in FIG. 1. Also provided as part of such delivery means is guide bar 48 spaced opposite screw conveyor 40 having end 50 terminating short of end 42 of screw conveyor 40 yet immediately adjacent periphery 20 of wheel 18.

Referring now to the configuration illustrated in FIG. 2 of flash portion 52 which is to be removed from the untrimmed article, such portion 52 is cylindrical in overall peripheral contour and comprises tubular section 54 having a flange portion 56 flaring outwardly from its upper end at substantially the same angle as upwardly tapering surfaces 24 and 25 of wheel 18 and anvil 14, plus an identical lower flange portion 58 at its lower end also flaring outwardly at an angle substantially equal to that of surfaces 28 and 29 of wheel 18 and anvil 14. Horizontal distances 60 and 62 spanning cutting path 12 perpendicular to the surfaces of vertical land sections 26, 38 and 30, 32 are less than the outside diameter of upper and lower flange portions 56, 58 of flash portion 52 by an amount on the order of 0.03 to 0.1 inch. Short planar molded surface 104 of the lower usable portion of article 68 is beneath flange portion 58 of flash 52 and will form the outer edge of the top sealing surface of the later formed container and act as an abutment for a tight fitting closure member, not shown, in surface-to-surface engagement therewith.

In accordance with the principles of the invention, means, indicated generally at 64 in FIG. 1, are provided delaying penetration of the thermoplastic material forming articles 68 by rotary blade cutting means, yet to be described, until after such articles 68 are engaged by fixed 14 and moving guide means 18. Such means 64 in the preferred illustrated embodiment includes means for rotationally supporting circular blade 70 of the rotary blade cutting means subjacent and angularly eccentrically offset relative to axis 46 of drive wheel 18 toward cutting path 12, plus means, such as motor 76, for rotating such blade 70 at a differential peripheral speed with respect to that of drive wheel 18. Conventional means may be provided for varying the rotary speed of blade 70 as required. The eccentric offset of shaft 78 of drive motor 76 of the rotary blade cutting means is indicated in FIG. 1 as 80. The source of power for rotating blade 70 may be taken from that for turning wheel 18 (or vice versa) via conventional members such as intermediate pinions and meshing chains, or it may be independent thereof, the latter being preferable for versatility of the system. Blade 70 is preferably vertically adjustable in conventional manner, for example, via a pin, not shown, associated with housing 79 for passage through a vertical retaining slot in shaft 78, in order to change the elevation as required. Such blade is likewise preferably radially adjustable with respect to path 12, e.g. to compensate for slight reductions in diameter occurring after resharpening blades which have become dull in use. The diameter 82 of blade 70 is different from and may be either greater or less than that of wheel 18, the latter being shown in FIG. 1. Though the amount 80 of eccentric offset, or in other words the location of the blade axis with respect to that of wheel 18, may also vary, it is preferably located such that peripheral cutting surface 72 enters path 12 within the first quadrant of an imaginary 360 degree path when viewed from above as in FIG. 1.

Flash drive wheel 84 and cooperating opposing flash anvil 86 having a contour 88 matching that of wheel 84 form extension 90 between them of cutting path 12 terminating above collection area 92 where trimmed flash 52 is deposited prior to recycling. The width of extension 90 and the vertical outline of flash drive wheel 84 and flash anvil 86, though not shown, are such as to cooperate with the contour of each trimmed flash portion 52 after separation from the rest of article 68 in order to positively drive it toward and eventually into collection area 92.

From an operational standpoint, a method is provided for trimming flash 52 from blow molded articles 68 having walls formed of thermoplastic material as such articles successively traverse cutting path 12, which method reduces the variability in vertical position and horizontal flatness or planarity of the cut. Though the temperature of the thermplastic material of untrimmed article 68 may vary within wide limits, e.g. from a temperature at the upper end whereat the material is just able to sustain some version of its previously molded form to the lower end whereat the material is fully set and dimensionally stable, in the illustrated embodiment, such thermoplastic material in the region of cutting plane 66 is at an elevated temperature within such just-mentioned limits which can be defined with respect to the glass transition temperature of the thermoplastic material as from about 70°F. less than to about 70°F. greater than such glass transition temperature. Also, though the blow molded hollow articles being trimmed may assume any shape, in the illustrated embodiment, the usable portion left after trimming is in the form of a tubular preform to be remolded in a downstream station into a container, and comprises a rather thick walled, elongated body 94, having a spirally threaded external surface at its upper end and a lower end 96 opposite that to which flash 52 is initially integrally attached which is spherical in contour and therefore incapable of acting as the article support surface without using some auxilliary means should it be desired to stand the part upright.

In the illustrated embodiment, untrimmed articles 68 are rotatably advanced from an upstream blow molding station in spaced relationship with respect to each other and in continuous sequence toward cutting path 12 between flights 98 of rotating screw 40 and adjacent guide bar 48. With the illustrated conveyor-guide bar layout, such parts 68 turn clockwise, as represented by arrow 100 in FIG. 1, during such advancing movement. On reaching end 42 of screw 40, articles 68 are at the inlet end of cutting path 12 and are there engaged by drive wheel 18 which is also turning in a clockwise direction. However, when articles 68 are engaged by wheel 18 they necessarily will reverse rotation and start to turn counterclockwise in the direction of arrow 102. Such change in direction results in an initial deceleration in peripheral speed as the clockwise movement terminates followed by an acceleration of such speed in the counterclockwise direction up to that of wheel 18, and it is important not to commence cutting during such reversing movement when the part tends to be unstable. Therefore, when the illustrated layout with the screw outboard of the guide bar is used, the direction of rotation of articles 68 after engagement with the guide members of the trimming assembly is the reverse of that during advancement via screw 40. Reversing the position of screw 40 and bar 48 to avoid such rotation reversal of the part would undesirably result in a dead spot in the conveying path since end 42 of screw 40 would have to be terminated short of plane 44 to avoid interference with wheel 18. Accordingly, it is extremely important, especially with the system of the illustrated embodiment, that a time interval be allowed for articles 68 to become captured by and firmly gripped and stabilized by guide members 18 and 14 before commencing cutting. This is especially so when it is desired that cutting surface 72 of the blade (FIG. 2) penetrate the plastic as close as mechanically possible along plane 66, which is an extension of short molded surface 104, without actually contacting such molded surface 104. In other words a tolerance of essentially zero exists in the vertical direction between surface 104 and cutting plane 66 in the illustrated embodiment.

When articles 68 are presented by screw 40 at the inlet end of cutting path 12 at which point they intersect plane 44 in FIG. 1, opposite surface portions of each flange 56 and 58 of flash 52 are engaged by gripping lands 26, 38, 30, 32 of laterally adjacent, curved fixed and rotating guide members 18 and 14, since, as described, the diameter of the flanges is less than the horizontal distance between such lands. Though alternative types of engaging surfaces and flash configurations may be used, this type of compressive engagement of the flash is preferred for the following reasons. More specifically, the overall thickness of the usable portion of article 68 (FIG. 2) is quite substantial since it is necessary to have sufficient material in the preform to later form the larger container, and this is also true of tubular portion 54 of flash 52. On the other hand, the material forming flanges 56 and 58 has been expanded further in the upstream blow mold and, as illustrated, is thinner in cross section and therefore cooler than thicker tubular portion 54 after retention for a given time period in the blow mold. Therefore contact with the lands preferably occurs at relatively thin flanges 56 and 58 which are cooler than thicker tubular portion 54 and therfore not as prone to deform to such an extent as the latter. Each article with flash portion 52 captured in the manner described then advances initially along a circular arc portion of path 12 defined by angle A in FIG. 1 of at least 10°, while rolling counterclockwise against anvil 14 at substantially the same peripheral speed as that of wheel 18. Angle A represents the portion of path 12 traversed by each article prior to initial penetration by cutting edge 72 during which the vertical position of the part is precisely established by firmly gripping and stabilizing the articles, and eliminating any wobble caused by the described reversal of direction of rotation.

As a feature of the illustrated manner of gripping, any tendency of articles 68 to ride upwardly in vertical position from that illustrated in FIG. 2 as they rollingly traverse path 12 is restrained by opposing centering nose portions 22 and 36 of the fixed and rotating guide members which enter the annulus between tubular portion 54 and the outer periphery of flanges 56 and 58 during initial engagement. As can be realized, if the part attempts to rise vertically during advancement along path 12, it will be restrained by tapered surface 28 of the drive wheel and opposite surface 29 of the anvil abutting the upper surface of lower flange 58. On the other hand, if the part is inclined to roll downwardly out of vertical position, similar action will occur between surfaces 24 and 25 of the drive wheel and anvil and the opposing tapered surface of upper flange 56.

Movement continues along cutting path 12 until penetration starts by rotating the part into cutting surface 72 of rotating blade 70 at cutting plane 66 (FIG. 2) after the article has traversed the chordal distance defined by angle A. Continued movement along path 12 results in a smooth, progressively gradually increasing depth of cut toward axis 106 via slicing of blade 70 through the wall of the thermoplastic material along plane 66 between flash 52 and body 94 of article 68. During such cutting, blade 70 is rotating preferably in the direction of movement of the article 68 and at a peripheral speed different and preferably greater than that of wheel 18 in order to slice cleanly through the relatively hot thermoplastic material in a true, shearing, non-splitting type of penetration leaving a top surface on the trimmed preform of high quality. It is this high speed cutting action of the blade which is capable of providing a good quality top surface on the trimmed article over a wider range of elevated temperatures (e.g. 100% increase) of the thermoplastic material than has been possible with a fixed blade wherein movement of the part with respect to the blade is controlled by the relatively slow rotary speed of drive wheel 18. Peripheral speeds of 500 to 2200 f.p.m. of cutting surface 72 have been successfully employed, whereas the peripheral speed of wheel 18 will largely be determined by the capacity of the overall system. Speeds of the latter of between 100 to 350 f.p.m. have been successfully utilized.

After flash portion 52 has been separated from the remainder of the article, (at about the 80° position in FIG. 1, considering plane 44 to be 0°) it is engaged by flash drive wheel 84 which rolls it against fixed flash anvil 86 along flash discharge path 90 after which is drops by gravity into lower collection area 92. The trimmed, finished article may be handled by any suitable means, but when at elevated temperature as in the illustrated embodiment, it preferably falls by gravity into a waiting receiving means, not shown, aligned below it at the end of the cut point.

Though the means for delaying penetration of the thermoplastic material by the rotary blade cutting means of the present invention is preferably the eccentric offset positioning of the separate blade drive shaft, alternative means for accomplishing the intended result may also be used. Thus, the blade might be greater in diameter than that of the drive wheel and initially positioned eccentrically away from cutting path 12 (e.g. in the third quadrant in FIG. 1) while gripping between the fixed and rotary members is established, and then after passage of the part through angle A, the eccentrically positioned blade could be moved concentric to drive wheel 18 in order to accomplish cutting, receding thereafter to an out-of-action position while the next part is gripped. Alternatively, such blade diameter could be less than the drive wheel and initially mounted concentric with the latter while gripping occurs, whereupon after passage of the part through angle A, the smaller diameter cutting wheel could be moved eccentrically, e.g. to the position illustrated in FIG. 1, in order to accomplish cutting in the manner previously described.

Though the system has been described in connection with sectioning thermoplastic materials at elevated temperature in a part which is non-self-supporting, it should be realized that conventional self-supporting containers and other articles wherein the plastic has been fully set may be sectioned equally well with the system described.

Though the eccentric offset of the blade member and drive wheel has been illustrated with separate rotary support assemblies for each, a single assembly containing a pair of offset spindle units journaled for separate rotation by independent drive means could be used for purposes of mechanical simplicity and process versatility.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. In apparatus for trimming flash from blow molded articles of thermoplastic material as they move along a path of travel which includes:
    curvilinear fixed guide means and laterally spaced moving guide means including a drive wheel having a circumference matching the curvilinear contour of the fixed guide means forming said path between them; and
    a rotary blade adjacent said path for severing the flash from the articles as they traverse said path;
    the improvement in said apparatus whereby said articles are well supported before engagement with said rotary blade, which improvement comprises, in combination
    means for mounting said blade below and eccentrically offset with respect to the axis of said wheel toward said path; and
    means for rotating the blade at a peripheral speed different from that of said drive wheel.

2. The apparatus of claim 1 wherein said blade is vertically adjustable with respect to the plane of said wheel.

3. The apparatus of claim 1 including:
 means for presenting said articles to said path comprising:
  i. a screw conveyor adjacent and extending generally perpendicular to said drive wheel having a terminal end lying substantially in a vertical plane through the longitudinal axis of said wheel; and
  ii. a guide bar spaced opposite said screw conveyor having an end terminating short of that of said screw conveyor and immediately adjacent the periphery of said wheel.

4. The apparatus of claim 1 wherein:
 i. said flash is cylindrical in peripheral contour and comprises a tubular section having a flange portion on either end;
 ii. said moving guide member is a wheel having a vertical contour continuous around its full periphery which includes:
  a. a nose portion projecting toward said path and a vertical gripping land on either side and rearward of said nose portion; and
 iii. said fixed guide member is curved to match the periphery of said wheel and has a vertical contour substantially complementing that of said wheel;
 iv. the horizontal distance between the lands on said wheel and fixed guide member being incrementally less than that of the diameter of the flange portions of said flash.

5. In a method of trimming flash from blow molded articles of thermoplastic material which includes:
 cutting through the thermoplastic material at the joint between the flash and the remainder of each article with a blade rotating within a path of travel of the articles as they are advanced along said path between fixed and moving guide members;
 the improvement in said method whereby the variability in vertical position and horizontal planarity of the cut is reduced, which improvement comprises, in combination, the step of:
 engaging the flash area of said articles with said guide members for a distance of at least ten degress of a circular arc before commencing the cutting, the thermoplastic material in the region of the cut being at elevated temperature within a range defined with aspect to the glass transition temperature of the thermoplastic material as from about 70°F. less than to about 70°F. greater than said glass transition temperature, the peripheral speed of said rotating blade during cutting being greater than the speed of said moving guide member.

6. The process of claim 5 wherein said path is curvilinear and said articles are driven along said path for said distance before contacting said cutting blade.

7. A method of trimming flash from blow molded articles of thermoplastic material as they successively traverse a cutting path, said flash having a tubular configuration with a flange at either end, said method comprising:
 A. compressively engaging opposing surface portions of each of said flanges with gripping lands of laterally adjacent curved, fixed and rotating guide members forming an arcuate cutting path for said articles between them;
 B. rollingly advancing said thus engaged articles against said fixed guide member and along said path by means of said rotating guide member for at least ten degrees of a circular arc at substantially the same peripheral speed as that of said rotating guide member and restraining any tendency of said articles to substantially vary in vertical position by means of opposing centering nose portions on said fixed and rotating guide members entering the annular space between said tubular portion and the periphery of said flanges and restrainably abutting said flanges to prevent any such substantial variation; and thereafter
 C. continuing said advancing rolling movement along the cutting path while progressively gradually penetrating the wall of the thermoplastic material in the joint between the flash and the rest of the article with a blade intersecting said path and rotating at a peripheral speed different from that of the rotating guide member to sever the flash from the rest of the article.

8. The method of claim 7 wherein the end of the article being trimmed opposite from that attached to the flash is substantially spherical.

9. The method of claim 7 wherein the thermoplastic material in the region of the cut is at elevated temperature within a range defined with respect to the glass transition temperature of the thermoplastic material as from about 70°F. less than to about 70°F. greater than said glass transition temperature.

10. The method of claim 7 including the step of:
 rotatably advancing said articles from an upstream station in spaced relationship toward said cutting path between the flights of a rotating screw and an adjacent guide rail and depositing them at the inlet end of said cutting path for pickup by said guide members.

11. The process of claim 7 including the step of:
 driving the separated flash to a central collection area with a flash drive wheel and cooperating anvil forming an extension of said cutting path between them terminating above said collection area.

12. The process of claim 10 wherein the direction of rotation of the article reverses after engagement with said guide members from that during advancement by said screw.

* * * * *